(12) United States Patent
Kobayashi et al.

(10) Patent No.: US 8,202,594 B2
(45) Date of Patent: Jun. 19, 2012

(54) DOUBLE-SIDED ADHESIVE TAPE FOR FIXING DECORATIVE SHEET FOR SPEAKER AND METHOD FOR ATTACHING DECORATIVE SHEET FOR SPEAKER TO HOUSING

(75) Inventors: Mutsumi Kobayashi, Ibaraki (JP); Kazuyuki Yagura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 434 days.

(21) Appl. No.: 12/432,273

(22) Filed: Apr. 29, 2009

(65) Prior Publication Data
US 2009/0272491 A1    Nov. 5, 2009

(30) Foreign Application Priority Data
Apr. 30, 2008    (JP) .................. 2008-118041

(51) Int. Cl.
*B32B 9/00*    (2006.01)
*B32B 33/00*    (2006.01)
*B32B 7/12*    (2006.01)

(52) U.S. Cl. ............. 428/40.1; 428/41.5; 428/41.9; 428/343; 428/355 R; 428/355 AC

(58) Field of Classification Search ........... 428/40.1, 428/41.5, 41.9, 343, 355 R, 355 AC
See application file for complete search history.

(56) References Cited

U.S. PATENT DOCUMENTS

| 5,631,073 A | 5/1997 | Riedel et al. |
| 5,989,708 A * | 11/1999 | Kreckel ............... 428/354 |
| 7,923,503 B2 * | 4/2011 | Takahashi et al. ........... 524/460 |

FOREIGN PATENT DOCUMENTS

| EP | 1 820 835 A1 | 8/2007 |
| EP | 1 835 003 A2 | 9/2007 |
| EP | 1 990 388 A2 | 11/2008 |
| JP | 7-305038 A | 11/1995 |
| JP | 9-157612 A | 6/1997 |
| JP | 2003193006 A * | 7/2003 |

OTHER PUBLICATIONS

European Search Report dated Aug. 20, 2009.

* cited by examiner

*Primary Examiner* — Patricia Nordmeyer
(74) *Attorney, Agent, or Firm* — Sughrue Mion, PLLC

(57) ABSTRACT

The present invention provides a double-sided adhesive tape for fixing a decorative sheet for speaker, which includes a nonwoven fabric substrate, an acrylic pressure-sensitive adhesive layer A disposed on one side of the nonwoven fabric substrate and an acrylic pressure-sensitive adhesive layer B disposed on the other side of the nonwoven fabric substrate, in which the adhesive tape has a tensile strength in the tape flow (MD) direction of 8 N/10 mm or more and a tensile length in the width (TD) direction of 8 N/10 mm or more. The double-sided adhesive tape is excellent in the adhesion performance to a housing and a decorative sheet for speaker and at the same time, has excellent releasability ensuring that when separating the decorative sheet portion, smooth separation can be attained without leaving a residue of tape or pressure-sensitive adhesive on the housing portion.

7 Claims, 1 Drawing Sheet

DOUBLE-SIDED ADHESIVE TAPE FOR FIXING DECORATIVE SHEET FOR SPEAKER AND METHOD FOR ATTACHING DECORATIVE SHEET FOR SPEAKER TO HOUSING

FIELD OF THE INVENTION

The present invention relates to a double-sided adhesive tape for fixing a decorative sheet for speaker, which is used in attaching a decorative sheet having a given opening portion to the speaker portion of a television set, an audio system and the like. The present invention also relates to a method for attaching a decorative sheet for speaker to a housing by using the double-sided adhesive tape for fixing a decorative sheet for speaker.

BACKGROUND OF THE INVENTION

In various industrial fields such as home electric appliances, automobiles and OA equipment, a double-sided adhesive tape (herein, it is intended to include also a double-sided adhesive sheet) is utilized as joining means with good operability and high reliability of adhesion. For example, in the front of a speaker of a television set, an audio system and the like, a decorative sheet having a given opening portion is attached together with gauze or the like by using a double-sided adhesive tape so as not to impair the acoustic performance such as sound volume and audio quality. In recent years, many television sets or audio systems are black in color for giving a sense of high quality. In turn, many decorative sheets or double-sided adhesive tapes used therefor are black in color. In such usage, for example, in order not to impair the design property, there has been proposed a double-sided adhesive tape reduced in the glossiness of the pressure-sensitive adhesive layer surface that is used on the decorative sheet side (see, for example, JP-A-7-305038 and JP-A-9-157612).

In the case where a decorative sheet is fixed on the speaker portion of a housing by using a double-sided adhesive tape and then miss positioning or other abnormalities of the product are generated, the decorative sheet portion is sometimes separated together with the double-sided adhesive tape immediately or at the product inspection to reuse the housing (main body portion). On this occasion, the above-described conventional double-sided adhesive tape may cause a problem that the tape is torn during separation and remains on the speaker housing portion or even if the tape can be separated without tearing, so-called "adhesive residue" of leaving a pressure-sensitive adhesive on the housing portion occurs, requiring an operation of removing the residue with a solvent or the like, as a result, the operation of removing the decorative sheet portion is reduced in the workability.

SUMMARY OF THE INVENTION

An object of the present invention is to provide a double-sided adhesive tape for fixing a decorative sheet for speaker, which is excellent in the adhesion performance to a housing and a decorative sheet for speaker (hereinafter sometimes simply referred to as a "decorative sheet") and at the same time, has excellent releasability ensuring that when separating the decorative sheet portion, smooth separation can be attained without leaving a residue of tape or pressure-sensitive adhesive on the housing portion. Another object of the present invention is to provide a double-sided adhesive tape for fixing a decorative sheet for speaker, which has a low surface glossiness and moreover, which is free from increase of the glossiness with aging and does not impair the sense of high quality of the product.

As a result of intensive studies to achieve the above-described objects, the present inventors have found that in a double-sided adhesive tape using a nonwoven fabric and an acrylic pressure-sensitive adhesive layer as a substrate and a pressure-sensitive adhesive layer, respectively, when the tensile strength in each of the MD and TD directions of the tape is set to a specific value, a double-sided adhesive tape satisfying both the adhesiveness and the releasability (reworkability) and being excellent particularly as an adhesive tape for fixing a decorative sheet for speaker can be obtained. The present invention has been accomplished based on this finding.

That is, the present invention provides the following items.

1. A double-sided adhesive tape for fixing a decorative sheet for speaker, which comprises a nonwoven fabric substrate, an acrylic pressure-sensitive adhesive layer A disposed on one side of the nonwoven fabric substrate and an acrylic pressure-sensitive adhesive layer B disposed on the other side of the nonwoven fabric substrate, said adhesive tape having a tensile strength in the tape flow (MD) direction of 8 N/10 mm or more and a tensile length in the width (TD) direction of 8 N/10 mm or more.

2. The double-sided adhesive tape according to item 1, wherein said layer A disposed on one side of the nonwoven fabric substrate has a gel fraction of from 30 to 70% and said layer B disposed on the other side of the nonwoven fabric substrate has a gel fraction of from 10 to 50%, and wherein the gel fraction of said layer A is larger than the gel fraction of said layer B.

3. The double-sided adhesive tape according to item 1 or 2, which further comprises a release liner having an unevenness on at least one surface thereof, said surface having the unevenness having an arithmetic mean roughness Ra of 0.1 to 10 μm, wherein the release liner is provided on the surface of said layer A such that the surface having the unevenness is brought into contact with the surface of said layer A.

4. The double-sided adhesive tape according to item 3, wherein the unevenness on the surface of the release liner has no regularity.

5. The double-sided adhesive tape according to any one of items 1 to 4, wherein the surface of said layer A has a glossiness of from 0 to 10%.

6. The double-sided adhesive tape according to any one of items 1 to 5, wherein the surface of said layer A has a glossiness after a storage in an atmosphere at 50° C. for 2 weeks of from 0 to 10%.

7. The double-sided adhesive tape according to item 3 or 4, wherein the unevenness of the release liner is transferred onto the surface of said layer A by coating an acrylic pressure-sensitive adhesive composition on the surface having the unevenness of the release liner.

8. A method for attaching a decorative sheet for speaker to a housing, comprising attaching said layer A side of the double-sided adhesive tape according to any one of items 1 to 7 to a decorative sheet for speaker and attaching said layer B side of said adhesive tape to a housing, thereby attaching and fixing the decorative sheet for speaker onto the housing.

The double-sided adhesive tape for fixing a decorative sheet for speaker of the present invention has the above-described constructions, so that the double-sided adhesive tape can exhibit excellent adhesion to a decorative sheet for speaker and a housing and, when separating the decorative sheet for speaker, it can be smoothly separated without leaving a residue of tape or pressure-sensitive adhesive layer on the housing. Also, by using a release liner having unevenness on the surface or the like, the surface glossiness can be controlled and an excellent matting effect can be thereby obtained. Furthermore, by adjusting the gel fraction of the pressure-sensitive adhesive layers, the durability of attachability to curved surface and matting effect can be enhanced. Accordingly, the double-sided adhesive tape of the present invention can be used very suitably for application of attaching a decorative sheet for speaker to the speaker portion of a housing.

DESCRIPTION OF REFERENCE NUMERALS AND SIGNS

Figure 1:
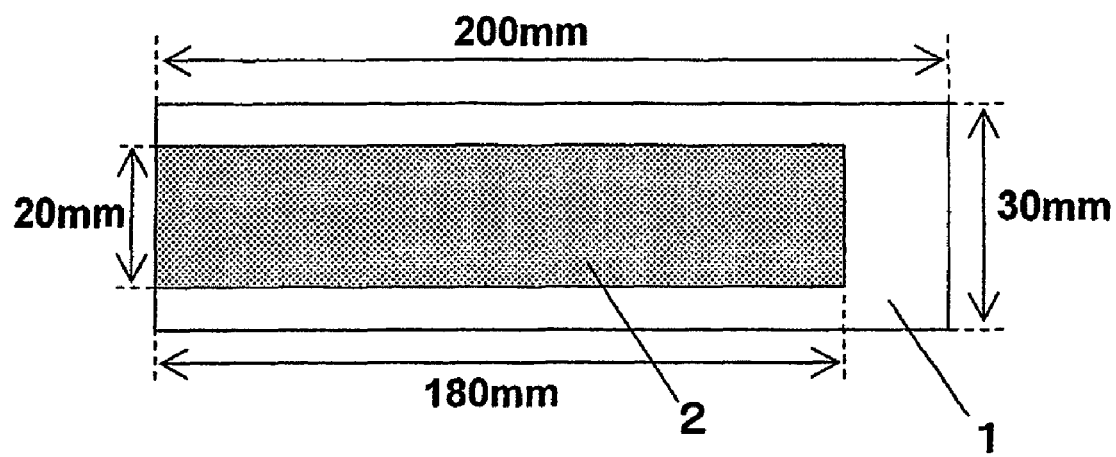
FIG. 1 is a schematic view (top view) showing the specimen used in the repulsion resistance test in Examples.

1 Polystyrene plate
2 Aluminum plate
3 Jig
4 Lifting distance at end

DETAILED DESCRIPTION OF THE INVENTION

The double-sided adhesive tape for fixing a decorative sheet for speaker according to the present invention (hereinafter sometimes simply referred to as the "double-sided adhesive tape of the present invention") has an acrylic pressure-sensitive adhesive layer composed of an acrylic pressure-sensitive adhesive on each side of a substrate composed of a nonwoven fabric (nonwoven fabric substrate). Incidentally, in the followings, the acrylic pressure-sensitive adhesive layer on one side of the nonwoven fabric substrate is sometimes referred to as a layer A, and the acrylic pressure-sensitive adhesive layer on the other side of the substrate is sometimes referred to as a layer B. Although it is not particularly limited, in using the double-sided adhesive tape for fixing a decorative sheet for speaker of the present invention, it is preferred to use the layer A as the pressure-sensitive adhesive layer on the side (decorative sheet side) attached to a decorative sheet for speaker (decorative sheet) and to use the layer B as the pressure-sensitive adhesive layer on the side (housing side) attached to a housing. The "tape" as used herein includes not only a tape-shaped member but also a sheet-shaped member. That is, the "double-sided adhesive tape" also includes a "double-sided adhesive sheet".

Nonwoven Fabric Substrate

As for the nonwoven fabric constituting the substrate of the double-sided adhesive tape of the present invention, a conventional or known nonwoven fabric (for example, Manila hemp, pulp, a chemical fiber such as rayon, acetate fiber, polyester fiber, polyvinyl alcohol fiber, polyamide fiber or polyolefin fiber, or a mixture thereof) used as the substrate of double-sided adhesive tapes may be used. Above all, a nonwoven fabric containing Manila hemp is preferred, and a nonwoven fabric composed only of Manila hemp is most preferred. Use of a nonwoven fabric as the substrate brings about good followability to unevenness or curved surface of the housing or decorative sheet, whereby excellent pressure-sensitive adhesive characteristics are obtained. In the case of using a plastic film substrate or the like, bad followability to unevenness or curved surface results due to rigidity of the substrate and also, adhesive deposit may occur because of bad anchoring effect.

The nonwoven fabric composed only of Manila hemp indicates a fabric where only a Manila hemp fiber is used as the raw material constituting the nonwoven fabric and fibers are bound to each other at the production of the nonwoven fabric only by mutually intertwining Manila hemp fibers without applying a resin impregnation processing using viscose or the like, which is usually performed for binding fibers to each other at the production of a nonwoven fabric. In the case where the nonwoven fabric composed only of Manila hemp is used as the substrate and a pressure-sensitive adhesive is coated thereon, the pressure-sensitive adhesive readily intrudes into a gap between fibers as compared with a nonwoven fabric subjected to a normal resin impregnation processing and acts as a binder for binding fibers to each other and, as a result, the tensile strength of the double-sided adhesive tape can be advantageously increased.

The nonwoven fabric used as the nonwoven fabric substrate (hereinafter, this fabric is sometimes simply referred to as a "nonwoven fabric") of the double-sided adhesive tape of the present invention preferably satisfies the physical properties set forth in the following A) to E).

A) The grain ratio of the nonwoven fabric is preferably 80% or more (for example, from 80 to 100%), more preferably from 90 to 100%. If the grain ratio is less than 80%, the isotropy of strength or elongation in the MD direction (flow direction, direction of nonwoven fabric production line) and TD direction (width direction, direction orthogonal to the MD direction) is lost and when such a nonwoven fabric is used as the substrate of a double-sided adhesive tape, at the time of separating a decorative sheet attached via the double-sided adhesive tape from a housing, the double-sided adhesive tape is readily torn along the strength-wise weak direction of the nonwoven fabric and the tape may remain on the housing. Incidentally, the grain ratio as used in the present invention indicates a ratio between the tensile strength in the MD direction of nonwoven fabric and the tensile strength in the TD direction ((tensile strength in TD direction/tensile strength in MD direction)×100 (%)).

B) The tear strength (in the MD and TD directions) of the nonwoven fabric is preferably from 0.49 to 0.78 N. If the tear strength is less than 0.49 N, at the time of separating a decorative sheet attached via the double-sided adhesive tape from a housing, the double-sided adhesive tape may be easily torn, whereas if the tear strength exceeds 0.78 N, the nonwoven fabric is poorly impregnated with a pressure-sensitive adhesive at the pressure-sensitive adhesion processing due to high fiber density of the nonwoven fabric and in particular, at the time of separating a decorative sheet attached via the double-sided adhesive tape from a housing, the pressure-sensitive adhesive may remain on the housing surface. The tear strength of the nonwoven fabric can be measured in accordance with the JIS-P-8116 method.

C) The tensile strength (in MD and TD directions) of the nonwoven fabric is preferably from 9.8 to 19.6 N/15 mm. If the tensile strength is less than 9.8 N/15 mm, the tensile strength of the double-sided adhesive tape is decreased and at the time of separating a decorative sheet from a housing, the double-sided adhesive tape may be readily torn, whereas if the tensile strength exceeds 19.6 N/15 mm, the nonwoven fabric is poorly impregnated with a pressure-sensitive adhesive and in particular, at the time of separating a decorative sheet attached via the double-sided adhesive tape from a housing, the pressure-sensitive adhesive may remain on the housing surface. The tensile strength of the nonwoven fabric can be measured in accordance with the JIS-P-8113 method.

D) The difference in elongation between the MD direction and the TD direction of the nonwoven fabric is preferably 50% or less, more preferably 30% or less, still more preferably 0%. Here, the difference in elongation between the MD direction and the TD direction is a value calculated by substituting the elongation value in the MD direction (flow direction) of the nonwoven fabric and the elongation value in the TD direction (width direction) as measured in accordance with the JIS-P-8132 method into the following formula 1. In the nonwoven fabric used for the nonwoven fabric substrate of the present invention, the elongation in the MD direction and the elongation in the TD direction are preferably equal and, specifically, the difference in elongation between the MD direction and the TD direction preferably satisfies the range specified above. If a nonwoven fabric failing in satisfying the above-specified range for the difference in elongation between the MD direction and the TD direction is used as the substrate of the double-sided adhesive tape, the tape may be readily torn at the time of separating a decorative sheet attached via the double-sided adhesive tape from a housing or the dimensional stability may be impaired when processing the double-sided adhesive tape.

$$\text{Difference (\%) in elongation between } MD \text{ direction and } TD \text{ direction} = \frac{|\text{Elongation (\%) in } MD \text{ direction} - \text{Elongation (\%) in } TD \text{ direction}| \times 100}{\{\text{Elongation (\%) in } MD \text{ direction} + \text{Elongation (\%) in } TD \text{ direction}\}/2}$$ (Formula 1)

E) The air permeability of the nonwoven fabric is preferably 0.3 sec or less, more preferably 0.2 sec or less. If the air permeability of the nonwoven fabric exceeds 0.3 sec, the impregnating ability of a pressure-sensitive adhesive into the nonwoven fabric is decreased when coating the pressure-sensitive adhesive on the nonwoven fabric and the strength of the double-sided adhesive tape may become insufficient. The air permeability of the nonwoven fabric can be measured in accordance with the JIS-P-8117 method.

In view of releasability and prevention of adhesive residue, the nonwoven fabric used for the nonwoven fabric substrate of the present invention preferably satisfies all of the physical properties specified in A) to E) above.

The thickness of the nonwoven fabric used for the nonwoven fabric substrate of the present invention (thickness of the nonwoven fabric substrate) is not particularly limited but is preferably 80 µm or less, more preferably from 30 to 60 µm.

Acrylic Pressure-Sensitive Adhesive and Acrylic Pressure-Sensitive Adhesive Layer The acrylic pressure-sensitive adhesive layers (layers A and B) in the double-sided adhesive tape of the present invention is composed of an acrylic pressure-sensitive adhesive (sometimes simply referred to as a "pressure-sensitive adhesive"). The acrylic pressure-sensitive adhesive is a pressure-sensitive adhesive containing an acrylic polymer as the base polymer (main component). As for the main monomer component constituting the acrylic polymer, a (meth)acrylic alkyl ester having a linear or branched alkyl group (hereinafter, sometimes simply referred to as a "(meth)acrylic acid alkyl ester") may be suitably used. Examples of the (meth)acrylic acid alkyl ester include a (meth)acrylic $C_{1-20}$ alkyl ester such as methyl(meth)acrylate, ethyl(meth)acrylate, propyl(meth) acrylate, isopropyl(meth)acrylate, butyl(meth)acrylate, isobutyl(meth)acrylate, s-butyl(meth)acrylate, tert-butyl (meth)acrylate, pentyl(meth)acrylate, isopentyl(meth)acrylate, hexyl(meth)acrylate, heptyl(meth)acrylate, octyl(meth) acrylate, 2-ethylhexyl(meth)acrylate, isooctyl(meth) acrylate, nonyl(meth)acrylate, isononyl(meth)acrylate, decyl (meth)acrylate, isodecyl(meth)acrylate, undecyl(meth) acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl (meth)acrylate, nonadecyl(meth)acrylate and eicosyl(meth) acrylate. Among these, a (meth)acrylic acid $C_{2-14}$ alkyl ester is preferred, a (meth)acrylic acid $C_{2-10}$ alkyl ester is more preferred, and butyl acrylate is still more preferred. The term "(meth)acryl" as used herein indicates "acryl" and/or "methacryl", and the same applies to others.

One of these (meth)acrylic acid esters may be used alone, or two or more thereof may be used in combination. Incidentally, since the (meth)acrylic acid alkyl ester is used as the predominant monomer component (monomer main component) of the acrylic polymer, the proportion of the (meth) acrylic alkyl ester is, for example, preferably 60 wt % or more (for example, from 60 to 99 wt %), more preferably 80 wt % or more, based on the total amount of monomer components for forming the acrylic polymer.

In the acrylic polymer, various copolymerizable monomers such as polar group-containing monomer and polyfunctional monomer may be used as another monomer component. By using a copolymerizable monomer as another monomer component, for example, the adhesive force to an adherend may be enhanced or the cohesive force of the pressure-sensitive adhesive may be raised. One of copolymerizable monomers may be used alone, or two or more thereof may be used in combination.

Examples of the polar group-containing monomer include a carboxyl group-containing monomer such as (meth)acrylic acid, itaconic acid, maleic acid, fumaric acid, crotonic acid and isocrotonic acid, or an anhydride thereof (e.g., maleic anhydride); a hydroxyl group-containing monomer such as hydroxyalkyl(meth)acrylate (e.g., hydroxyethyl(meth)acrylate, hydroxypropyl(meth)acrylate, hydroxybutyl(meth) acrylate), vinyl alcohol and allyl alcohol; an amide group-containing monomer such as acrylamide, methacrylamide, N,N-dimethyl(meth)acrylamide, N-methylol(meth)acrylamide, N-methoxymethyl(meth)acrylamide and N-butoxymethyl(meth)acrylamide; an amino group-containing monomer such as aminoethyl(meth)acrylate, dimethylaminoethyl (meth)acrylate and tert-butylaminoethyl (meth)acrylate; a glycidyl group-containing monomer such as glycidyl(meth) acrylate and methylglycidyl(meth)acrylate; a cyano group-containing monomer such as acrylonitrile and methacrylonitrile; a heterocyclic ring-containing vinyl-based monomer such as N-vinyl-2-pyrrolidone, (meth)acryloylmorpholine, N-vinylpyridine, N-vinylpiperidone, N-vinylpyrimidine, N-vinylpiperazine, N-vinylpyrrole, N-vinylimidazole and N-vinyloxazole; an alkoxyalkyl(meth)acrylate monomer such as methoxyethyl(meth)acrylate and ethoxyethyl(meth) acrylate; a sulfonic acid group-containing monomer such as sodium vinylsulfonate; a phosphoric acid group-containing monomer such as 2-hydroxyethylacryloyl phosphate; an imido group-containing monomer such as cyclohexylmaleimide and isopropylmaleimide; and an isocyanate group-containing monomer such as 2-methacryloyloxyethyl isocyanate. Among these polar group-containing monomers, a carboxyl group-containing monomer or an anhydride thereof and a hydroxyl group-containing monomer are preferred, and an acrylic acid, hydroxyethyl acrylate and hydroxybutyl acrylate are more preferred.

The amount of the polar group-containing monomer used is 30 wt % or less (for example, from 1 to 30 wt %), preferably from 2.5 to 20 wt %, based on the total amount of monomer components for forming the acrylic polymer. If the amount of the polar group-containing monomer used exceeds 30 wt %, for example, the cohesive force of the acrylic pressure-sensitive adhesive becomes excessively high and the pressure-sensitive adhesiveness of the pressure-sensitive adhesive layer may decrease, whereas if the amount of the polar group-containing monomer used is too small (for example, less than 1 wt %), the effect of the copolymer of these monomers may not be obtained. Above all, it is preferred to use a carboxyl group-containing monomer or an anhydride thereof in an amount of 2.5 to 10 wt % or a hydroxyl group-containing monomer in an amount of 0.01 to 1 wt %.

Examples of the polyfunctional monomer include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl(meth)acrylate, divinylbenzene, epoxy acrylate, polyester acrylate and urethane acrylate.

The amount of the polyfunctional monomer used is 2 wt % or less (for example, from 0 to 2 wt %), preferably from 0 to 1 wt %, based on the total amount of monomer components for forming the acrylic monomer. If the amount of the polyfunctional monomer used exceeds 2 wt % based on the total amount of monomer components for forming the acrylic monomer, for example, the cohesive force of the pressure-sensitive adhesive becomes excessively high and the pressure-sensitive adhesiveness decreases.

Examples of the copolymerizable monomer other than the polar group-containing monomer and polyfunctional monomer include a (meth)acrylic acid ester except for the above-described (meth)acrylic acid alkyl ester, such as alicyclic hydrocarbon group-containing (meth)acrylic acid ester (e.g., cyclopentyl(meth)acrylate, cyclohexyl(meth)acrylate, isobornyl(meth)acrylate) and aromatic hydrocarbon group-containing (meth)acrylic acid ester (e.g., phenyl(meth)acrylate); vinyl esters such as vinyl acetate and vinyl propionate; aromatic vinyl compounds such as styrene and vinyl toluene; olefins or dienes such as ethylene, butadiene, isoprene and isobutylene; vinyl ethers such as vinyl alkyl ether; and vinyl chloride.

The content of the acrylic polymer as the base polymer is not particularly limited but is preferably 40 wt % or more, more preferably from 50 to 80 wt %, based on the total weight of the acrylic pressure-sensitive adhesive layer.

The acrylic polymer can be prepared by a known or conventional polymerization method. Examples of the polymerization method include a solution polymerization method, an emulsion polymerization method, a bulk polymerization method and a polymerization method by ultraviolet irradiation. Among these, a solution polymerization method is preferred in view of cost and mass production. At the polymerization, appropriate components according to the polymerization method, such as polymerization initiator, chain transfer agent, emulsifier and solvent, may be appropriately selected from known or conventional compounds and used.

The polymerization initiator, chain transfer agent and the like used at the polymerization of the acrylic polymer are not particularly limited and may be appropriately selected from known or conventional compounds. More specifically, preferred examples of the polymerization initiator include an oil-soluble polymerization initiator such as an azo-based polymerization initiator, e.g., 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate); and a peroxide-based polymerization initiator, e.g., benzoyl peroxide, tert-butyl hydroperoxide, di-tert-butyl peroxide, tert-butyl peroxybenzoate, dicumylperoxide, 1,1-bis(tert-butylperoxy)3,3,5-trimethylcyclohexane, 1,1-bis(tert-butylperoxy) cyclododecane. One of these polymerization initiators may be used alone, or two or more thereof may be used in combination. The amount of the polymerization initiator used may be a normal amount and can be selected, for example, in the range of approximately from 0.01 to 1 part by weight per 100 parts by weight of all monomer components.

As for the solvent used at the time of polymerizing the acrylic polymer by solution polymerization, a known or conventional organic solvent or the like may be used, and examples thereof include an ester-based solvent such as ethyl acetate and methyl acetate; a ketone-based solvent such as acetone and methyl ethyl ketone; an alcohol-based solvent such as methanol, ethanol and butanol; a hydrocarbon-based solvent such as cyclohexane, hexane and heptane; and an aromatic solvent such as toluene and xylene. One of these organic solvents may be used alone, or two or more thereof may be mixed and used.

In the present invention, a crosslinking agent is preferably added to the acrylic pressure-sensitive adhesive constituting the layers A and B. The crosslinking agent plays the role of controlling the gel fraction (proportion of the solvent-insoluble portion) of the pressure-sensitive adhesive layer. Examples of the crosslinking agent include an isocyanate-based crosslinking agent, an epoxy-based crosslinking agent, a melamine-based crosslinking agent, a peroxide-based crosslinking agent, a urea-based crosslinking agent, a metal alkoxide-based crosslinking agent, a metal chelate-based crosslinking agent, a metal salt-based crosslinking agent, a carbodiimide-based crosslinking agent, an oxazoline-based crosslinking agent, an azilidine-based crosslinking agent and an amine-based crosslinking agent. Among these, an isocyanate-based crosslinking agent is preferred. One of these crosslinking agents may be used alone, or two or more thereof may be used in combination.

Examples of the isocyanate-based crosslinking agent include lower aliphatic polyisocyanates such as 1,2-ethylene diisocyanate, 1,4-butylene diisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylylene diisocyanate. Other examples thereof include a trimethylolpropane/tolylene diisocyanate trimer adduct ("Coronate L", trade name, produced by Nippon Polyurethane Industry Co., Ltd.) and a trimethylolpropane/hexamethylene diisocyanate trimer adduct ("Coronate HL", trade name, produced by Nippon Polyurethane Industry Co., Ltd.).

Examples of the epoxy-based crosslinking agent include N,N,N',N'-tetraglycidyl-m-xylenediamine, diglycidylaniline, 1,3-bis(N,N-glycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, diglycidyl adipate, diglycidyl o-phthalate, triglycidyl-tris(2-hydroxyethyl) isocyanurate, resorcin diglycidyl ether, bisphenol-S-diglycidyl ether, and an epoxy-based resin having two or more epoxy groups within the molecule.

From the standpoint of adjusting the gel fraction to the preferred range, the amount of the crosslinking agent (particularly, isocyanate-based crosslinking agent) used is, in the pressure-sensitive adhesive constituting the layer A, preferably from 3 to 10 parts by weight, more preferably from 3.5 to 5.5 parts by weight, per 100 parts by weight of the acrylic polymer, and in the pressure-sensitive adhesive constituting the layer B, preferably from 1 to 5 parts by weight, more preferably from 1.5 to 3.5 parts by weight, per 100 parts by weight of the acrylic polymer.

In the present invention, from the standpoint of enhancing the pressure-sensitive adhesiveness, a tackifying resin is preferably added to the acrylic pressure-sensitive adhesive constituting the layers A and B. Examples of the tackifying resin include a terpene-based tackifying resin, a phenolic tackifying resin, a rosin-based tackifying resin and a petroleum-based tackifying resin. Among these, a phenolic tackifying resin is preferred. One of these tackifiers may be used alone, or two or more thereof may be used in combination.

Examples of the terpene-based tackifying resin include a terpene-base resin such as α-pinene polymer, β-pinene polymer and diterpene polymer, and a modified terpene-based resin (e.g., terpene phenolic resin, styrene-modified terpene-based resin, aromatic-modified terpene-based resin, hydrogenated terpene-based resin) obtained by modifying (for example, phenol modification, aromatic modification, hydrogenation modification or hydrocarbon modification) the terpene-based resin above.

Examples of the phenolic tackifying resin include a condensate (e.g., alkylphenolic resin, xylene formaldehyde-based resin) of various phenols (e.g., phenol, m-cresol, 3,5-xylenol, p-alkylphenol, resorcin) with formaldehyde, a resol obtained by addition-reacting the phenols above with formaldehyde by an alkali catalyst, a novolak obtained by condensation-reacting the phenols above with formaldehyde by an acid catalyst, and a rosin-modified phenol resin obtained by adding and thermally polymerizing phenol and rosins (for example, an unmodified rosin, a modified rosin or various rosin derivatives) by an acid catalyst.

Examples of the rosin-based tackifying resin include an unmodified rosin (natural rosin) such as gum rosin, wood rosin and tall oil rosin, a modified rosin (e.g., hydrogenated rosin, disproportionated rosin, polymerized rosin, other chemically modified rosins), and various rosin derivatives. Examples of the rosin derivative include rosin esters such as a rosin ester compound obtained by esterifying an unmodified rosin with alcohols, and a modified rosin ester compound obtained by esterifying a modified rosin (e.g., hydrogenated rosin, disproportionated rosin, polymerized rosin) with alcohols; unsaturated fatty acid-modified rosins obtained by modifying an unmodified rosin or a modified rosin (e.g., hydrogenated rosin, disproportionated rosin, polymerized rosin) with an unsaturated fatty acid; unsaturated fatty acid-modified rosin esters obtained by modifying rosin esters with an unsaturated fatty acid; rosin alcohols obtained by reducing the carboxyl group in unmodified rosins, modified rosins (e.g., hydrogenated rosin, disproportionated rosin, polymerized rosin), unsaturated fatty acid-modified rosins or unsaturated fatty acid-modified rosin esters; and a metal salt of rosins (particularly, rosin esters) such as unmodified rosin, modified rosin and various rosin derivatives.

Examples of the petroleum-based tackifying resin which can be used include a known petroleum resin such as aromatic petroleum resin, aliphatic petroleum resin, alicyclic petroleum resin (aliphatic cyclic petroleum resin), aliphatic/aromatic petroleum resin, aliphatic/alicyclic petroleum resin, hydrogenated petroleum resin, coumarone-based resin and coumarone-indene-based resin. More specifically, examples of the aromatic petroleum resin include a polymer using only one species or two or more species of vinyl group-containing aromatic hydrocarbons having a carbon number of 8 to 10 (e.g., styrene, o-vinyltoluene, m-vinyltoluene, p-vinyltoluene, α-methylstyrene, β-methylstyrene, indene and methylindene). As for the aromatic petroleum resin, an aromatic petroleum resin (so-called "C9 petroleum resin") obtained from a fraction (so-called "C9 petroleum fraction") such as vinyl toluene and indene may be suitably used. Examples of the aliphatic petroleum resin include a polymer using only one species or two or more species of olefins or dienes having a carbon number of 4 to 5 (for example, an olefin such as butene-1, isobutylene and pentene 1; and a diene such as butadiene and piperylene (1,3-pentadiene) and isoprene). As for the aliphatic petroleum resin, an aliphatic petroleum resin (so-called "C4 petroleum resin" or "C5 petroleum resin") obtained from a fraction (so-called "C4 petroleum fraction" or "C5 petroleum fraction") such as butadiene, piperylene and isoprene may be suitably used. Examples of the alicyclic petroleum resin include an alicyclic hydrocarbon-based resin obtained by cyclizing and dimerizing an aliphatic petroleum resin (so-called "C4 petroleum resin" or "C5 petroleum resin") and then polymerizing the dimer, a polymer of cyclic diene compound (e.g., cyclopentadiene, dicyclopentadiene, ethylidene norbornene, dipentene, ethylidene bicycloheptene, vinylcycloheptene, tetrahydroindene, vinylcyclohexene and limonene), a hydrogenation product thereof, and an alicyclic hydrocarbon-based resin obtained by hydrogenating the aromatic ring in the above-described aromatic hydrocarbon resin or the aliphatic/aromatic petroleum resin below. Examples of the aliphatic/aromatic petroleum resin include a styrene-olefin-based copolymer. As for the aliphatic/aromatic petroleum resin, a so-called "C5/C9 copolymer petroleum resin" or the like may be used.

The tackifying resin may be a commercial product and, for example, "SUMILITERESIN PR-12603", trade name, produced by Sumitomo Bakelite Co., Ltd., or "PENSEL D125", trade name, produced by Arakawa Chemical Industries, Ltd. may be used.

The amount of the tackifying resin added is preferably from 1 to 60 parts by weight, more preferably from 20 to 50 parts by weight, per 100 parts by weight of the acrylic polymer. If the amount added is less than 1 part by weight, the pressure-sensitive adhesive force may not be sufficiently brought out, whereas if it exceeds 60 parts by weight, the adhesiveness may decrease.

In addition to these components, the acrylic pressure-sensitive adhesive may contain, if desired, known additives such as antiaging agent, filler, colorant (e.g., pigment and dye), ultraviolet absorber, antioxidant, plasticizer, softener, surfactant and antistatic agent, within the range of not impairing the characteristics of the present invention.

In the present invention, in view of design property, the acrylic pressure-sensitive adhesive layer may be colored. The color for coloration varies depending on a speaker as the adherend and is not particularly limited but, for example, a black color or a color with gray or dark gray tone is suitably used. In particular, the pressure-sensitive adhesive used for the layer A is preferably colored black so as to make less perceivable the surface of the pressure-sensitive adhesive layer visible from the opening portion of the decorative sheet for speaker. Such coloration can be attained by adding a pigment (color pigment) to an extent of not impairing the effects of the present invention.

In the case of coloring black the acrylic pressure-sensitive adhesive layer, for example, carbon black may be used. In view of coloration degree and the like, the amount of the carbon black used is, for example, preferably from 0.1 to 10 parts by weight, more preferably from 0.5 to 4 parts by weight, per 100 parts by weight of the acrylic polymer.

The gal fraction of the layer A in the double-sided adhesive tape of the present invention is preferably from 30 to 70% (wt %), more preferably from 35 to 50%. The layer A is usually used by attaching it to a decorative sheet. If the gel fraction is less than 30%, the layer A becomes soft and to have large fluidity, and even when unevenness is formed on the pressure-sensitive adhesive layer surface for the purpose of matting, the surface may be flattened at high temperatures or with aging to raise the glossiness with aging and decrease the matting effect, whereas if the gel fraction exceeds 70%, the adhesiveness to a decorative sheet decreases.

The gal fraction of the layer B in the double-sided adhesive tape of the present invention is preferably from 1 to 50% (wt %), more preferably from 20 to 35%. The layer B is usually used by attaching it to a housing. If the gel fraction is less than 10%, the pressure-sensitive adhesive characteristics and processability may decrease, whereas if the gel fraction exceeds 50%, the layer B becomes hard and the adhesiveness or repulsion resistance may decrease to deteriorate the attachability to curved surface.

The gel fraction of the layer A is preferably larger than the gel fraction of the layer B (i.e., (gel fraction of layer A)>(gel fraction of layer B)). If the gel fraction of the layer A is lower than the gel fraction of the layer B, the matting effect and the pressure-sensitive adhesive characteristics such as repulsion resistance may not be satisfied at the same time. The gel fraction can be controlled, for example, by the monomer composition of acrylic polymer or the kind or content of crosslinking agent.

The gel fraction (proportion of solvent-insoluble portion) is a value calculated by the following "Measuring Method for Gel Fraction".

(Measuring Method for Gel Fraction)

About 0.1 g of the pressure-sensitive adhesive is sampled from the pressure-sensitive adhesive layer of the double-sided adhesive tape, wrapped with a porous tetrafluoroethylene sheet ("NTF1122", trade name, produced by Nitto Denko Corporation) having an average pore size of 0.2 μm, tied up with a kite string and at this time, measured for the weight, and the weight measured is designated as the weight before immersion. Incidentally, the weight before immersion is the total weight of the pressure-sensitive adhesive layer (pressure-sensitive adhesive), the tetrafluoroethylene sheet and the kite string. Also, the weight in total of the tetrafluoroethylene sheet and the kite string are measured and this weight is designated as the wrapper weight.

Subsequently, the pressure-sensitive adhesive layer wrapped with tetrafluoroethylene sheet and tied up with kite string (hereinafter referred to as the "sample") is put in a 50 ml-volume vessel filled with ethyl acetate and allowed to stand still at room temperature for 1 week (7 days). The sample (after ethyl acetate treatment) is then taken out from the vessel, transferred to an aluminum-made cup, dried in a dryer at 130° C. for 2 hours to remove the ethyl acetate, and measured for the weight, and the weight measured is designated as the weight after immersion.

The gel fraction is calculated according to the following formula:

$$\text{Gel fraction (wt \%)} = (A-B)/(C-B) \times 100 \qquad (2)$$

(In formula (2), A is the weight after immersion, B is the wrapper weight, and C is the weight before immersion.)

The thicknesses of the acrylic pressure-sensitive adhesive layers (layers A and B) in the double-sided adhesive tape of the present invention are not particularly limited but are preferably from 30 to 100 μm, more preferably from 50 to 80 μm, respectively. If the thickness of the pressure-sensitive adhesive layer is less than 30 μm, the adhesive performance sometimes deteriorates, whereas if it exceeds 100 μm, the processability may decrease. Incidentally, the pressure-sensitive adhesive layer may take either a single-layer form or a multilayer form. The thickness above of the pressure-sensitive adhesive layer indicates, when the pressure-sensitive adhesive layer is formed by a transfer method, the thickness of the pressure-sensitive adhesive layer formed on a release liner or the like before transfer to a nonwoven fabric substrate.

Double-Sided Adhesive Tape for Fixing Decorative Sheet for Speaker

The double-sided adhesive tape for fixing a decorative sheet for speaker of the present invention can be produced by forming the layers A and B on both sides of the nonwoven fabric substrate, respectively. The methods for forming the layers A and B are not particularly limited and may be appropriately selected from known methods for forming a pressure-sensitive adhesive layer. Specific examples of the method include a method where the acrylic pressure-sensitive adhesive above (or an acrylic pressure-sensitive adhesive solution) is coated and dried (if desired, further cured) on the nonwoven fabric substrate surface (direct method), and a method where the acrylic pressure-sensitive adhesive is coated and dried (if desired, further cured) on the surface of an appropriate release liner to form a pressure-sensitive adhesive layer and the pressure-sensitive adhesive layer is transferred (moved and fixed) onto a nonwoven fabric substrate (transfer method).

Of these methods, from the standpoint of decreasing the glossiness and imparting the matting effect by forming unevenness on the pressure-sensitive adhesive layer surface, the method for forming the layer A is preferably the transfer method. More specifically, the transfer method is preferred in that unevenness of a release liner having the unevenness on a surface thereof is transferred onto the surface of the layer A by coating and drying (if desired, further curing) the acrylic pressure-sensitive adhesive on the surface of the release liner having the unevenness to form the layer A and therefore, when the layer A is transferred onto the nonwoven fabric substrate, the unevenness is formed on the surface of the layer A to effectively impart matting performance (low glossiness).

On the other hand, the method for forming the layer B is not particularly limited.

Incidentally, at the coating of the acrylic pressure-sensitive adhesive, a conventionally employed coater (e.g., gravure coater, reverse roll coater, kiss roll coater, dip roll coater, bar coater, knife coater, spray coater) may be used.

The tensile strength in the flow direction (MD direction) and the tensile strength in the width direction (TD direction) of the double-sided adhesive tape of the present invention both are 8 N/10 mm or more, preferably 10 N/10 mm or more. If the tensile strength in either one of MD direction and TD direction is less than 8 N/10 mm, at the time of separating the decorative sheet from the housing, the double-sided adhesive tape tends to tort and the tape tends to remain on the housing. The upper limit of the tensile strength is not particularly limited but is generally about 40 N/10 mm. The tensile strength (sometimes referred to as "tape tensile strength") as used herein means the "tensile strength (N/10 mm)" when a tensile test of the double-sided adhesive tape (indicating the portion excluding the release liner) is performed using a tensile tester in accordance with JIS Z 0237 at a pulling speed of 100 mm/min. The tensile test can be performed, for example, under the conditions of a sample width of 10 mm and a tensile tester's chuck distance of 50 mm.

The glossiness of the surface of the layer A (layer A surface) of the double-sided adhesive tape of the present invention is preferably from 0 to 10%, more preferably from 0 to 5%. The layer A is mainly used on the decorative side and therefore, if the glossiness exceeds the range above, gloss of the layer A surface is seen from the opening portion of the decorative sheet, which sometimes impairs the design property. The glossiness can be measured in accordance with JIS Z 8741. More specifically, for example, a value measured using a digital variable gloss meter (manufactured by Suga Test Instruments Co., Ltd.) at an incident angle/light-receiving angle of 45° may be used. The method for obtaining the layer A having the glossiness above is not particularly limited, but preferred examples thereof include a method of, as described above, forming the layer A on a release liner having unevenness on a surface thereof and then transferring the layer.

The glossiness of the layer A surface after storing the double-sided adhesive tape of the present invention in an atmosphere at 50° C. for 2 weeks is also preferably from 0 to 10%, more preferably from 0 to 5%. If the glossiness after storage in an atmosphere at 50° C. for 2 weeks exceeds 10%, the layer A surface is flattened with aging to decrease the matting effect and therefore, the design property may be impaired with aging in some cases. For suppressing the increase of glossiness with aging, it is effective to raise the gel fraction of the layer A to a certain extent as described above. Incidentally, when the double-sided adhesive tape has a release liner on the layer A surface, the glossiness of the layer A surface after storing the tape in a state of the release liner being separated and the layer A surface being open (exposed) in an atmosphere at 50° C. for 2 weeks preferably satisfies the range above.

In view of effect on the environment and human body, the toluene diffusion amount of the double-sided adhesive tape of the present invention is preferably 1,000 μg/g or less, more preferably 100 μg/g or less. If the toluene diffusion amount exceeds 1,000 μg/g, this may be at high risk of giving rise to generation of a so-called sick house syndrome.

The toluene diffusion amount is a value obtained by quantitative determination using a calibration curve for toluene which is previously prepared by performing measurement using a gas chromatograph apparatus (GC apparatus).

More specifically, the toluene diffusion amount is measured as follows. A sample is produced by cutting a piece in a predetermined size (1 cm×5 cm, area: 5 cm$^2$) from the double-sided adhesive tape immediately after production (immediately after coating the acrylic pressure-sensitive adhesive), separating the release liner (separator), and attaching one surface to an aluminum foil while putting another pressure-sensitive adhesive layer surface into an open state. After measuring the weight of the sample, the sample is placed in a 20 ml-volume vial container which is then hermetically plugged. The vial container containing the sample is heated at 150° C. for 10 minutes by using a head space sampler (HSS), and 1 ml of the gas in a heated state is injected into the gas chromatograph apparatus (GC apparatus) and measured.

The peak area of toluene is measured by GC and the content (μg/g) of toluene per unit weight of the sample is calculated from the calibration curve and quantitatively determined. Incidentally, the calibration curve is prepared by previously measuring a constant concentration of toluene by GC to determine the relationship between the peak area and the toluene amount.

Release Liner (Separator)

In the present invention, in view of protecting the pressure-sensitive adhesive surface or preventing blocking, the surface (pressure-sensitive adhesive surface) of at least one pressure-sensitive adhesive layer of the double-sided adhesive tape for fixing a decorative sheet for speaker is preferably protected by a release liner (separator) until usage. In particular, from the standpoint that unevenness is transferred onto the layer A surface to decrease the glossiness of the layer A surface and impart matting performance, a release liner having unevenness on a surface thereof is preferably provided on the layer A surface.

The release liner for use in the double-sided adhesive tape of the present invention is not particularly limited, and a known or conventional release sheet or the like may be used. Specific examples of the release liner which can be used include a separator substrate having on at least one surface thereof a layer release-treated with a release treating agent, a low adhesive substrate composed of a fluorine-based polymer (for example, polytetrafluoroethylene, polychlorotrifluoroethylene, polyvinyl fluoride, polyvinylidene fluoride, a tetrafluoroethylene-hexafluoropropylene copolymer or a chlorofluoroethylene-vinylidene fluoride copolymer), and a low adhesive substrate composed of a nonpolar polymer (for example, an olefin-based resin such as polyethylene or polypropylene).

The release liner which may be suitably used is, for example, a release liner where a release-treated layer is formed on at least one surface of a separator substrate. Examples of the separator substrate include a plastic substrate film (synthetic resin film) such as polyester film (e.g., polyethylene terephthalate film), olefin-based resin film (e.g., polyethylene film and polypropylene film), polyvinyl chloride film, polyimide film, polyamide film (nylon film) and rayon film, papers (e.g., high-quality paper, Japanese paper, Kraft paper, glassine paper, synthetic paper and topcoat paper), and a multilayer substrate obtained by laminating or co-extruding such films or papers (a composite of two or three layers). The release-treating agent constituting the release-treated layer is not particularly limited and, for example, a silicone-based release-treating agent, a fluorine-based release-treating agent or a long-chain alkyl-based release-treating agent may be used. One of these release-treating agents may be used alone, or two or more thereof may be used in combination.

As described above, a release liner having unevenness on a surface thereof is preferably provided on the layer A surface. The release liner having unevenness on a surface thereof is used by arranging the surface having unevenness as the release surface on the layer A side. When the release layer is arranged in such a manner, unevenness on the release liner surface is transferred onto the layer A surface to appropriately roughen the layer A surface, whereby the surface glossiness is reduced and a matting effect is obtained. The surface roughness (arithmetic mean roughness Ra) of the surface having unevenness (the surface to be used on the layer A side) of the release liner having unevenness on a surface thereof is preferably from 0.1 to 10 μm, more preferably from 2 to 4 μm. If the surface roughness is less than 0.1 μm, diffuse reflection on the layer A surface is reduced and a sufficiently high matting effect may not be obtained in some cases. On the other hand, if the surface roughness exceeds 10 μm, sufficient wetting to an adherend (decorative sheet) is not obtained due to excessively large unevenness on the layer A surface and the pressure-sensitive adhesive characteristics may decrease in some cases. The arithmetic mean roughness Ra can be determined in accordance with JIS-B-0601 and, for example, can be measured by a contact surface roughness meter "P-15" (manufactured by TENCOR).

The unevenness in the release liner having unevenness on a surface thereof preferably has no particular regularity. The regularity as used herein means that, for example, grid-like grooves are formed at a constant pitch distance on the release liner surface. Unevenness having no regularity is easy to produce and this is advantageous in terms of yield enhancement or cost.

As described above, the layer A for use in the present invention is preferably formed by a method of coating and drying (if desired, further curing) an acrylic pressure-sensitive adhesive on the surface having unevenness of the release liner having unevenness on a surface thereof to form a layer and then attaching and transferring the layer onto a nonwoven fabric substrate. In this case, the release liner can be used as it is for protecting the layer A.

The release liner may be provided on the pressure-sensitive adhesive layer surface of both sides (layer A and layer B), or after providing a release liner having a back release layer on one pressure-sensitive adhesive surface, the sheet may be wound to bring the back release layer of the separator into contact with the pressure-sensitive adhesive surface on the opposite side.

The double-sided adhesive tape for fixing a decorative sheet for speaker of the present invention is used for attaching and fixing a decorative sheet for speaker onto the speaker portion of a housing (main body). The double-sided adhesive tape of the present invention has high tape tensile strength in addition to excellent adhesiveness to a decorative sheet for speaker and a housing, so that at the time of releasing the decorative sheet for speaker, separation can be smoothly performed without leaving a residue of the tape or pressure-sensitive adhesive layer on the housing. Also, in the case that the surface glossiness is controlled by using a release liner having unevenness on a surface thereof, an excellent matting effect is imparted particularly to the surface on the decorative sheet for speaker (layer A surface) and therefore, the design property is enhanced. Furthermore, by adjusting the gel fraction of the pressure-sensitive adhesive layers, the durability of attachability to curved surface and matting effect can be enhanced.

Examples of the decorative sheet for speaker include a net composed of polycarbonate (PC) and a gauze produced by roughly knitting a polyester fiber. Examples of the housing include a housing (main body portion) of television set, and the housing is composed of polystyrene, PC/ABS (polycarbonate/ABS resin) or the like in many cases.

In the case of attaching and fixing a decorative sheet for speaker onto a housing by using the double-sided adhesive tape for fixing a decorative sheet for speaker of the present invention, although not particularly limited, it is preferred to attach the layer A side of the double-sided adhesive tape to the decorative sheet for speaker and to attach the layer B side to the housing.

EXAMPLES

The present invention is described in greater detail below by referring to Examples, but the present invention is not limited to these Examples.

Example 1

(Black Acrylic Pressure-Sensitive Adhesive (A1))

Solution (A) was obtained by adding 40 parts by weight of terpene-modified phenolic tackifier ("SUMILITERESIN PR-12603", trade name, produced by Sumitomo Bakelite Co., Ltd.) and 2 parts by weight of black pigment ("ATDN101 Black", trade name, produced by Dainichiseika Color & Chemicals Mfg. Co., Ltd.) to 100 parts by weight of an acrylic polymer composed of a monomer composition of butyl acrylate: 100 parts by weight, acrylic acid: 3 parts by weight and hydroxyethyl acrylate: 0.1 part by weight.

Subsequently, 4 parts by weight of isocyanate-based crosslinking agent ("Coronate L", trade name, produced by Nippon Polyurethane Industry Co., Ltd.) per 100 parts by weight of the acrylic polymer and toluene were added to Solution (A) and made a uniform solution to obtain Black Acrylic Pressure-Sensitive Adhesive (solution) (A1).

(Black Acrylic Pressure-Sensitive Adhesive (A2))

2 Parts by weight of isocyanate-based crosslinking agent ("Coronate L", trade name, produced by Nippon Polyurethane Industry Co., Ltd.) per 100 parts by weight of the acrylic polymer and toluene were added to Solution (A) and made a uniform solution to obtain Black Acrylic Pressure-Sensitive Adhesive (solution) (A2).

(Nonwoven Fabric Substrate)

As for the nonwoven fabric of the nonwoven fabric substrate, a nonwoven fabric composed only of Manila hemp was used. This nonwoven fabric had a grain ratio of 93%, a tear strength (MD) of 0.65 N, a tear strength (TD) of 0.65 N, a tensile strength (MD) of 15 N/15 mm, a tensile strength (TD) of 14 N/15 mm, a difference in elongation between MD direction and TD direction of 0%, an air permeability of 0.2 sec, and a thickness of 45 μm.

(Double-Sided Adhesive Tape)

On the surface having unevenness of a release liner on which unevenness having no regularity were formed on one surface thereof and the arithmetic mean roughness Ra of the surface having unevenness was 2.8 μm, Black Acrylic Pressure-Sensitive Adhesive (A1) was coated to have a dry thickness of 75 μm, dried at 100° C. for 2 minutes and then laminated to the nonwoven fabric above to produce a decorative sheet-side pressure-sensitive adhesive layer.

Subsequently, Black Acrylic Pressure-Sensitive Adhesive (A2) was coated on a release liner ("75EPS (M) Cream (modified)", trade name, produced by Oji Paper Co., Ltd.) to have a dry thickness of 75 μm, dried at 100° C. for 2 minutes and laminated to the other surface of the nonwoven fabric (surface opposite the decorative sheet-side pressure-sensitive adhesive layer) to produce a housing-side pressure-sensitive adhesive layer.

In this way, the double-sided adhesive tape of the present invention was produced. The total thickness of the double-sided adhesive tape (the thickness from the decorative sheet-side pressure-sensitive adhesive layer surface to the housing-side pressure-sensitive adhesive layer surface) was 160 μm. Also, the gel fraction of the decorative sheet-side pressure-sensitive adhesive layer (corresponding to the "layer A") was 40%, and the gel fraction of the housing-side pressure-sensitive adhesive layer (corresponding to the "layer B") was 20%.

Example 2

A double-sided adhesive tape was produced in the same manner as in Example 1 except for using a nonwoven fabric composed only of Manila hemp (grain ratio: 100%, tear strength (MD): 0.69 N, tear strength (TD): 0.69 N, tensile strength (MD): 9.8 N/15 mm, tensile strength (TD): 9.8 N/15 mm, difference in elongation between MD direction and TD direction: 15%, air permeability: 0.1 sec, thickness: 75 μm) as the nonwoven fabric substrate.

Example 3

A double-sided adhesive tape was produced in the same manner as in Example 1 except for using the same Black Acrylic Pressure-Sensitive Adhesive (A2) on both surfaces of the nonwoven fabric substrate.

Example 4

A double-sided adhesive tape was produced in the same manner as in Example 1 except that a release liner having an arithmetic mean average Ra of 0.7 μm on the surface to be coated with (A1) (the surface having unevenness having no regularity) was used as the release liner to be coated with Black Acrylic Pressure-Sensitive Adhesive (A1) (the release liner on the decorative sheet side).

Example 5

A double-sided adhesive tape was produced in the same manner as in Example 1 except for using the same Black Acrylic Pressure-Sensitive Adhesive (A1) on both surfaces of the nonwoven fabric substrate.

Comparative Example 1

A double-sided adhesive tape was produced in the same manner as in Example 1 except for using a nonwoven fabric composed of rayon (grain ratio: 25%, tear strength (MD): 0.13 N, tear strength (TD): 0.09 N, tensile strength (MD): 6.5 N/15 mm, tensile strength (TD): 1.6 N/15 mm, difference in elongation between MD direction and TD direction: 20%, air permeability: 0.1 sec, thickness: 50 μm) as the nonwoven fabric substrate.

Evaluation

The double-sided adhesive tapes obtained in Examples and Comparative Example were evaluated for the tape tensile strength, pressure-sensitive adhesive force in normal state, reworkability, glossiness (initial and after storage at 50° C. for 2 weeks) and repulsion resistance according to the following measuring methods or evaluation methods. The evaluation results are shown in Table 1.

(1) Pressure-Sensitive Adhesive Force (N/20 mm) in Normal State

A piece of rectangular sheet of 20 mm (width)×100 mm (length) was cut out from the double-sided adhesive tape, and a 25 μm-thick PET film was laminated (lined) to the pressure-sensitive adhesive surface opposite the measuring surface to produce a sample for measurement of pressure-sensitive adhesive force.

A 180° peel test was performed in accordance with JIS Z0237. The sample for measurement and an adherend (stainless steel plate) were laminated together in normal state (23° C., 50% RH) and after passing of 30 minutes, the sample for measurement (double-sided adhesive tape) was peeled off by using a tensile tester. The weight at this time was taken as the adhesive force in normal state.

The measurement was performed in an atmosphere of 23° C. and 50% RH under the conditions of a peel angle of 180° and a pulling speed (separation speed) of 300 mm/min. The separating direction was the MD direction.

(2) Reworkability

The double-sided adhesive tape was cut into a size of 10 mm (width)×100 mm (length) (two kinds of specimens having, as the length direction, the MD direction or TD direction of the double-sided adhesive tape), the pressure-sensitive adhesive surface of the housing-side pressure-sensitive adhesive layer was laminated to a housing (stainless steel plate) by passing a 2-kg roller back and force once over the tape, the laminate was left standing at 50° C. for 2 hours and further at 23° C. and 50% RH for 2 hours, the release liner on the decorative sheet side was separated, and in this state, the double-sided adhesive tape was separated using a tensile tester (peel angle: 90°, separation speed: 300 mm/min).

The tape was observed visually, and the reworkability was rated good (A) when the double-sided adhesive tape was not broken in both the MD direction and the TD direction (in both of those two kinds of specimens), or the reworkability was rated bad (B) when broken even in either the MD direction or the TD direction (even in either one of those two kinds of specimens).

(3) Tensile Strength of Double-Sided Adhesive Tape (Tape Tensile Strength) (N/10 mm)

A rectangular sample of 10 mm in width was cut out from each of the MD direction (flow direction) and the TD direction (width direction) of the double-sided adhesive tape and used for measurement. Incidentally, the sample was used for measurement in a state of the release liner on both surfaces being separated.

A tensile test of the double-sided adhesive tape was performed in accordance with JIS Z 0237 by using a tensile tester under the conditions of a chuck distance of 50 mm and a pulling speed of 100 mm/min, and the tensile strength (N/10 mm) was measured and designated as the tape tensile strength.

(4) Repulsion Resistance Test

The pressure-sensitive adhesive surface on the decorative sheet side of the double-sided adhesive tape was laminated to an aluminum plate (20 mm (width)×180 mm (length), thickness: 0.4 mm) by means of a hand roller, the pressure-sensitive adhesive surface on the housing side of the double-sided adhesive tape was then press-bonded to a polystyrene plate (30 mm (width)×200 mm (length), thickness: 2 mm) by means of a laminator to prepare a specimen, and the specimen was left standing still in an environment of 23° C. for 24 hours. Incidentally, the double-sided adhesive tape was in the same size as the aluminum plate and laminated to the entire surface of the aluminum plate. Also, as shown in FIG. 1, the tape was laminated by aligning one lengthwise end of the aluminum plate with the widthwise central portion of the polystyrene plate.

Figure 2:
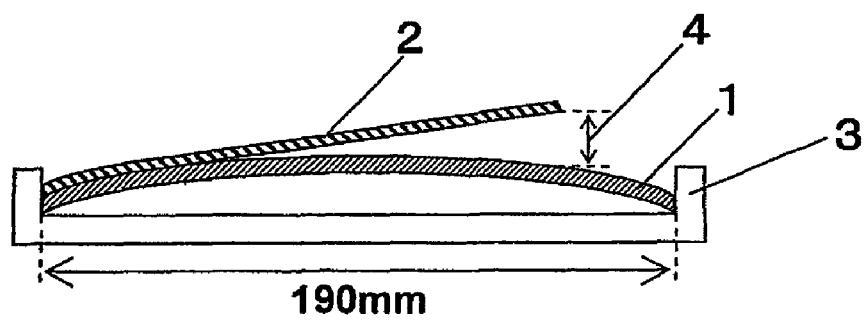
FIG. 2 is an explanatory view (schematic cross-sectional view) showing the specimen (in a state of the aluminum plate being lifted) fixed to the jig and the "lifting distance at the end" in the repulsion resistance test in Examples.

The specimen above was set in a 190 mm-wide jig, curved with the aluminum plate side outward and left standing in an environment of 70° C. for 72 hours, and the lifting distance (mm) at the end was measured. The "lifting distance at the end" as used herein indicates a distance for which the aluminum plate was lifted from the polystyrene plate on the side of the lengthwise end being not aligned (see, FIG. 2). Also, the jig above is designed to fix both ends in the length direction (200-mm length direction of the polystyrene) of the specimen to a width of 190 mm (see, FIG. 2) by curving the specimen.

(5) Glossiness (Initial and After Storage at 50° C. for 2 Weeks)

The pressure-sensitive adhesive layer surface on the decorative sheet side of the double-sided adhesive tape was measured using a digital variable gloss meter (manufactured by Suga Test Instruments Co., Ltd.) at an incident angle/light-receiving angle of 45°.

As for the "initial glossiness", the double-sided adhesive tape immediately after separating the release liner on the decorative sheet side was used as the sample for measurement. As for the "glossiness after storage at 50° C. for 2 weeks", the double-sided adhesive tape stored in an atmosphere at 50° C. for 2 weeks in a state of the pressure-sensitive adhesive layer surface being open by separating the release liner on the decorative sheet side from the double-sided adhesive tape was used as the sample for measurement.

TABLE 1

| | Tape Tensile Strength (N/10 mm) | | Surface Roughness (Ra) of Release Liner | Pressure-Sensitive Adhesive Layer on Housing Side | Pressure-Sensitive Adhesive Layer on Decorative Sheet Side | Reworkability | Glossiness (%) | | Repulsion Resistance (lifting distance) (mm) |
|---|---|---|---|---|---|---|---|---|---|
| | Flow Direction (MD) | Width Direction (TD) | (on decorative sheet side, surface having unevenness) (μm) | | | | Initial Glossiness (%) | Storage at 50° C. for 2 Weeks | |
| Example 1 | 17 | 15 | 2.8 | 13.8 | 12.4 | A | 3.5 | 5.3 | 0 |
| Example 2 | 13 | 13 | 2.8 | 14.1 | 12.7 | A | 3.5 | 5.3 | 0 |
| Example 3 | 17 | 15 | 2.8 | 13.8 | 13.0 | A | 3.5 | 18.3 | 0 |
| Example 4 | 17 | 15 | 0.7 | 13.8 | 13.1 | A | 13.8 | 15.7 | 0 |
| Example 5 | 17 | 15 | 2.8 | 13.6 | 12.4 | A | 3.5 | 5.3 | 27 |
| Comparative Example 1 | 9 | 4 | 2.8 | 14.0 | 12.6 | B | 3.5 | 5.3 | 0 |

A: Tape was not broken.
B: Tape was broken.

As seen from Table 1, the double-sided adhesive tape of the present invention (Examples) is excellent in the adhesive characteristics as well as high in pressure-sensitive adhesive force in both the decorative sheet side and the housing side and at the same time, excellent in the reworkability and thus has excellent characteristics as a double-sided adhesive tape for fixing a decorative sheet for speaker. Also, when the decorative sheet-side pressure-sensitive adhesive layer is formed using a release liner having unevenness on a surface thereof and having an appropriate surface roughness and the gel fractions of both pressure-sensitive adhesive layers are controlled to an appropriate range, the characteristics as a double-sided adhesive tape for fixing a decorative sheet for speaker, such as matting performance, durability thereof and repulsion resistance, can be further enhanced (Examples 1 and 2).

On the other hand, the double-sided adhesive tape with low tape tensile strength fails in satisfying both the adhesive characteristics and the reworkability (Comparative Example).

Furthermore, a decorative sheet for speaker (formed of polystyrene, diameter of punch hole: 0.6 mm φ, pitch: 1.2 mm, size: 30 mm×100 cm) was attached and fixed to the speaker portion located at the bottom of a housing (flat television, made of PC/ABS) by using the double-sided adhesive tape obtained in Example 1. That is, the decorative sheet above was attached to the surface of the decorative sheet-side pressure-sensitive adhesive layer of the double-sided adhesive tape of Example 1 cut into a size of 30 mm×100 cm, and the laminate of decorative sheet/double-sided adhesive tape was attached to the speaker portion of the housing. The thus-obtained speaker portion was finished with excellent design property and when the decorative sheet was separated, the double-sided adhesive tape or pressure-sensitive adhesive layer was not allowed to remain on the housing portion.

While the present invention has been described in detail and with reference to specific embodiments thereof, it will be apparent to one skilled in the art that various changes and modifications can be made therein without departing from the scope thereof.

This application is based on Japanese patent application No. 2008-118041 filed Apr. 30, 2008, the entire contents thereof being hereby incorporated by reference.

What is claimed is:

1. A double-sided adhesive tape for fixing a decorative sheet for speaker, which comprises a nonwoven fabric substrate, an acrylic pressure-sensitive adhesive layer A disposed on one side of the nonwoven fabric substrate and an acrylic pressure-sensitive adhesive layer B disposed on the other side of the nonwoven fabric substrate, wherein said layer A disposed on one side of the nonwoven fabric substrate has a gel fraction of from 30 to 70% and said layer B disposed on the other side of the nonwoven fabric substrate has a gel fraction of from 10 to 50%, wherein the gel fraction of said layer A is larger than the gel fraction of said layer B, and wherein said adhesive tape having a tensile strength in the tape flow (MD) direction of 8 N/10 mm or more and a tensile strength in the width (TD) direction of 8 N/10 mm or more.

2. The double-sided adhesive tape according to claim 1, which further comprises a release liner having an unevenness on at least one surface thereof, said surface having the unevenness having an arithmetic mean roughness Ra of 0.1 to 10 μm, wherein the release liner is provided on the surface of said layer A such that the surface having the unevenness is brought into contact with the surface of said layer A.

3. The double-sided adhesive tape according to claim 2, wherein the unevenness on the surface of the release liner has no regularity.

4. The double-sided adhesive tape according to claim 2, wherein the unevenness of the release liner is transferred onto the surface of said layer A by coating an acrylic pressure-sensitive adhesive composition on the surface having the unevenness of the release liner.

5. The double-sided adhesive tape according to claim 1, wherein the surface of said layer A has a glossiness of from 0 to 10%.

6. The double-sided adhesive tape according to claim 1, wherein the surface of said layer A has a glossiness after a storage in an atmosphere at 50° C. for 2 weeks of from 0 to 10%.

7. A method for attaching a decorative sheet for speaker to a housing, comprising attaching said layer A side of the double-sided adhesive tape according to claim 1 to a decorative sheet for speaker and attaching said layer B side of said adhesive tape to a housing, thereby attaching and fixing the decorative sheet for speaker onto the housing.

* * * * *